Figure 1:
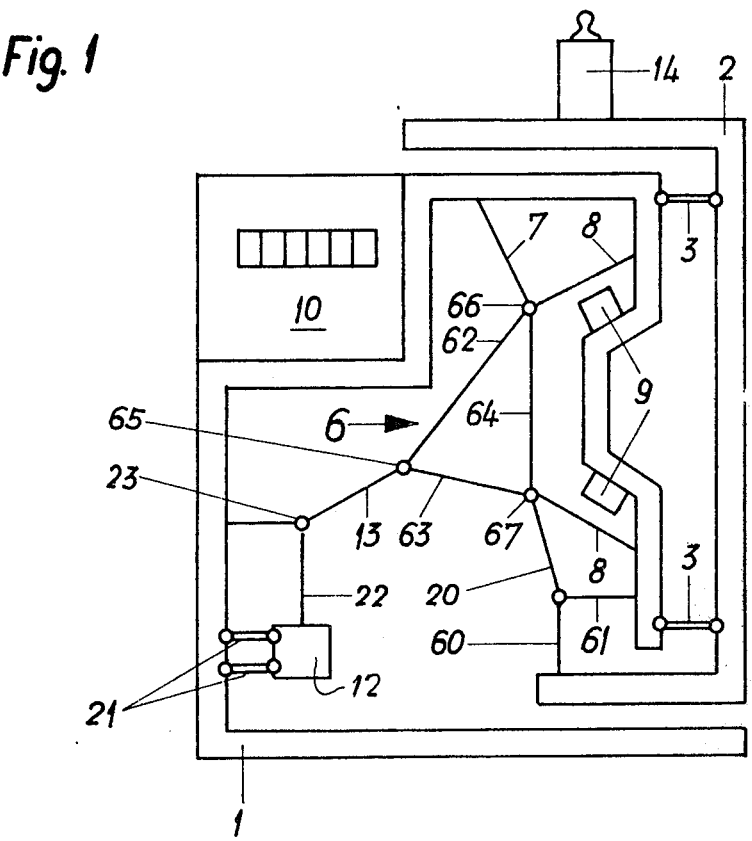

United States Patent [19]

Gallo

[11] 4,043,190
[45] Aug. 23, 1977

[54] MASS AND FORCE METER

[75] Inventor: Mario Gallo, Zurich, Switzerland

[73] Assignee: Wirth, Gallo & Co., Switzerland

[21] Appl. No.: 691,095

[22] Filed: May 28, 1976

[30] Foreign Application Priority Data

Feb. 9, 1976 Switzerland .................. 001576/76

[51] Int. Cl.$^2$ ............................................. G01L 5/12
[52] U.S. Cl. .......................... 73/141 R; 73/DIG. 1;
177/210 FP
[58] Field of Search ............ 73/88 R, 88.5 R, 141 R,
73/DIG. 1, 517 AV; 177/210 R, 210 FP

[56] References Cited

U.S. PATENT DOCUMENTS

| 3,423,999 | 1/1969 | Wirth et al. | 73/141 R |
| 3,621,713 | 11/1971 | Wirth et al. | 73/DIG. 1 |
| 3,692,128 | 9/1972 | Gallo | 73/141 R X |
| 3,724,573 | 4/1973 | Saner | 73/DIG. 1 |
| 3,805,605 | 4/1974 | Saner | 73/DIG. 1 |
| 3,885,427 | 5/1975 | Melcher et al. | 73/141 R |

Primary Examiner—Richard C. Queisser
Assistant Examiner—Charles Gorenstein
Attorney, Agent, or Firm—Stevens, Davis, Miller & Mosher

[57] ABSTRACT

Mass and force meter with a frame, a load-support and a measuring system, wherein the mass or force to be measured acts indirectly on the tension of two transversally vibrating, pre-loaded strings excited by electronic means, so that the resultant frequency changes serve for calculating the magnitude of said mass or force in a computing device, both strings, a first transmission element for the transmission of a pre-loading force and a second transmission element for the transmission of a force depending on the load to be measured being fixed to a force distributor guided in a statically determined way relatively to the frame by means of the two strings and of at least one guide with respect to the pre-loading force and to the force depending on the load to be measured. The force distributor comprises three parts forming a triangle, both strings, the guide and both transmission elements being fastened to the corners of the force distributor.

4 Claims, 2 Drawing Figures

MASS AND FORCE METER

U.S. patent Application Ser. No. 648,366 relates to a mass and force meter with a frame, a load-support and a measuring system, wherein the mass or force to be measured acts indirectly on the tension of two transversally vibrating, pre-loaded strings excited by electronic means, so that the resultant frequency changes serve for calculating the magnitude of said mass or force in a computing device. Both strings, a first transmission element for the transmission of a pre-loading force and a second transmission element for the transmission of a force depending on the load to be measured are fixed to a force distributor. The force distributor is guided in a statically determined way relatively to the frame by means of the two strings and of at least one guide with respect to the pre-loading force and to the force depending on the load to be measured.

Such force distributors are under bending and shearing stress. They must therefore be manufactured as very stiff members. As a consequence they have a certain inertia, which combined with other massive transmission element or elements, determines the magnitude of deviation of the results when the base on which the meter stands is submitted to rotational perturbations. As a result a given force distributor can have a positive or a negative influence on this deviation depending on the design of the transmission elements with which it is associated. It is the object of the invention to provide a meter in which the force distributor is not sensitive to rotational perturbations even if not combined with massive transmission elements.

Another object of the invention is a mass and force meter with a force distributor comprising three parts forming a triangle and in which both vibrating strings, said guide and both transmission elements are fastened to the corners of the force distributor.

In the accompanying drawing an embodiment of the object of the invention is schematically represented.

Figure 2:
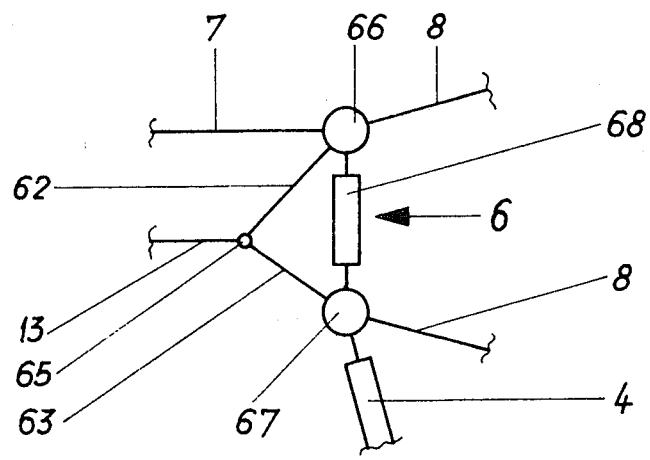

FIG. 1 shows a scale in elevation, and
FIG. 2 shows a variant.

In FIG. 1 a table scale is represented as embodiment. All elements are located substantially in the plane of the drawing. This scale presents a frame 1 to which a load support 2 is fixed by means of two guides 3 and guided parallelly and vertically. One end of a wire 60 is fixed to the load support 2. The other end is connected by means of a wire 20 acting as a transmission element with a force distributor 6. This force distributor 6 is fixed to a guide 7 connected to frame 1 and to both strings 8 so as to be suspended in a statically determined way. Guide 7 is traction resistant and mounted with an angle with the vertical direction. A second guide 61 connects wire 60 with frame 1. Both strings 8 are identical, one of their ends is fixed to frame 1, the other is fixed to force distributor 6. Exciting and sensing heads 9 are mounted between strings 8 and, as known in the art, connected with a digital computing and display device 10. A pre-loading mass 12 is fixed to frame 1 by means of guides 21. This mass 12 is fixed to a two-wire system 22, 23 which is connected by means of a wire 13 with force distributor 6.

This force distributor 6 comprises three wires 62,63,64, forming a triangle with corners 65,66,67. All five elements which are connected with force distributor 6, i.e. strings 8, guide 7 and wires 13 and 20 are fastened to the corners 65–67 of force distributor 6. These five elements are flexible so that they can transmit forces to force distributor 6 only over their ends. They cannot exert moments on said force distributor 6. As a consequence the only forces acting on force distributor 6 are these along wires 62–64. These wires 62–64 form force distributor 6 in this embodiment, they are under traction only.

The weight of pre-loading mass 12, transmitted to force distributor 6 by means of wire 13, generates the pre-loading force which acts on strings 8 and on guide 7. Mass 14 whose magnitude must be measured rests on load support 2. Its weight is transmitted by means of wires 60 and 20 to the force distributor 6 and generates the measuring force. This measuring force is compensated by strings 8 and guide 7 so that guide 7 remains always under traction.

In FIG. 2 a variant is represented, in which force distributor 6 comprises two wires 62,63 and a rigid rod 68. The measuring force is transmitted by means of a pressure bar 4. When it reaches a certain amount it acts on rod 68 as a pressure. Force distributor 6 could comprise two or three such rods, either because in two or three parts of force distributor 6 pressure forces are generated or because a three-rod distributor for example as a punched part is advantageous from a production point of view.

All five elements 7,8,13 and 60 (or 4 respectively) are always fastened to the three corners of force distributor 6, either as represented or in an arrangement in which two corners are connected to one element each and the third corner to the remaining three elements.

Any element can be fastened to any corner.

I claim:

1. Mass and force meter with a frame, a load-support and a measuring system, wherein the mass or force to be measured acts indirectly on the tension of two transversally vibrating, pre-loaded strings excited by electronic means, so that the resultant frequency changes serve for calculating the magnitude of said mass or force in a computing device, both strings, a first transmission element for the transmission of a pre-loading force and a second transmission element for the transmission of a force depending on the load to be measured being fixed to a force distributor guided in a statically determined way relative to the frame by means of the two strings and by means of at least one guide with respect to the pre-loading force and with respect to the force depending on the load to be measured, characterized in that the force distributor comprises three parts forming a triangle and that both strings, the guide and both transmission elements are fastened to the corners of the force distributor.

2. Mass and force meter according to claim 1, characterized by that the force distributor comprises three wires.

3. Mass and force meter according to claim 1, characterized by that at least one part of the force distributor is a rod.

4. Mass and force meter according to claim 1, characterized by that two corners of the force distributor are connected to two elements and the third corner is connected to one element.

* * * * *